Feb. 21, 1950   F. E. MARTIN   2,498,374
METHOD AND ARTICLE FOR TREATMENT
OF MAMMARY GLANDS
Filed Oct. 5, 1945

INVENTOR.
FRANCIS E. MARTIN
BY Joshua R. H. Potts
HIS ATTORNEY

Patented Feb. 21, 1950

2,498,374

UNITED STATES PATENT OFFICE 2,498,374

METHOD AND ARTICLE FOR TREATMENT OF MAMMARY GLANDS

Francis E. Martin, West Chester, Pa.

Application October 5, 1945, Serial No. 620,457

10 Claims. (Cl. 167—53.2)

This invention relates to a method and article for the treatment of mammary glands. This application is a continuation in part of my prior application Serial Number 560,227, filed October 25, 1944, entitled "Method and compound for treatment of mammary glands," which application is now abandoned.

Mastitis is an acute or chronic inflammation of the mammary gland. The disease has been known for many years and has caused severe loss to herd owners, although many attempts have been made to provide a cure.

The disease has been especially prevalent and seemingly intractable in the case of modern commercial dairying operations, since the pressure for increased production has caused herd owners to permit extremely short intervals between periods of lactation.

In view of the fact that the value of highly-bred dairy cattle is very great in comparison to their beef value, herd owners are faced with a severe financial hazard if the mastitis cannot be cured and checked.

Even in cases where it has been possible to cure mastitis, the herd owner has been subjected to extremely heavy losses by virtue of the fact that, during periods of treatment which frequently take a considerable period of time, the milk of the cow cannot be sold; thus, even though ultimate cure may be attained, the loss of production for an extended period is obviously very costly.

Heretofore, many attempts have been made to cure mastitis by the use of many different kinds of medicinal agents. Regardless of the kind of medicinal agent employed, so far as I am aware, injection of the medicinal agent in solution in quantities of 10 to 100 c. c. through the streak canal and into the teat canal has been accomplished by means of a syringe and canula. Obviously, such treatment requires surgical cleanliness in view of the possibility of bringing on even more serious infection of the udder, and it has been generally recognized that only someone trained in veterinary medicine could safely be entrusted with such an operation. The expense of such treatment and the loss of production of the cattle during the period of treatment thus combined to make the financial risk of the dairy herd owner a great one.

In spite of all the precautions outlined above, reaction or aggravation of inflammation in varying degrees was encountered and prolonged the period required to bring the cattle back to the production line when the method of treatment of the prior art was used.

A broad object of this invention is the provision of a novel method and article for the treatment of mastitis, so as to effect a cure more quickly and cheaply than has been heretofore possible. In accomplishing this object, I have provided a method and article which may be employed with ordinary precautions and without the surgical procedures which have been so costly in connection with known methods and products, and yet the cure will be accomplished so that the animal may be returned to the production line much more quickly than in cases where the old costly surgical treatment was employed.

I have found that introduction of water, oil, physiological saline solution, and other fluids used as menstruums for medicinal agents in prior art methods all produce some irritation, and that only the gland's own milk will not cause irritation—milk from another gland will produce some reaction. My method and article reduce to a minimum the hazard created by this phenomena.

In carrying out my method, I insert through the streak canal and into the teat canal, in solid form and low volume the medicinal agents required for treatment of the infection and employ the gland's own milk as a menstruum. My novel article for treatment of mastitis is a low volume, elongated, slender bougie formed of a milk-soluble carrier, which provides sufficient rigidity for insertion into the streak canal against the resistance of the sphincter muscle. In this solid and rigid carrier, which is bland itself, the medicinal agents are contained and distributed homogeneously throughout the body of the carrier.

A more limited object of my invention is the provision of such an article characterized by a provision for easy, quick and complete insertion into the teat canal, and protection means for insuring surgical cleanliness of the article from the time it is made until it finally comes to rest in the teat canal.

Other objects will appear hereinafter as this description proceeds in connection with the accompanying drawings, in which Figure 1 is a longitudinal view, partly in section and partly in elevation, showing my novel article for the treatment of mastitis.

Figure 2:
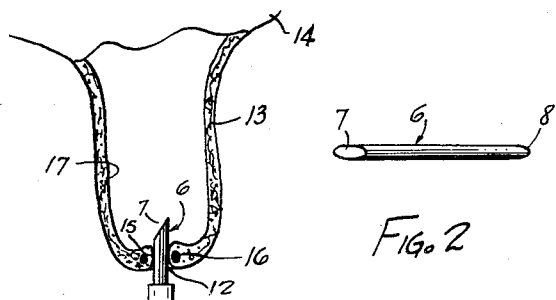
Figure 2 is an elevational view of my novel bougie.

Referring now to Figure 2, my bougie 6 is of low volume and has an elongated, cylindrical body provided with inclined or cam ends 7 and 8. Preferably, my bougie should have a length no greater than approximately four centimeters and a diameter of approximately no more than three millimeters. Of course, the length may vary, depending upon the rigidity and strength of the material from which the carrier body is made.

In forming my bougie, the body of which may be any one of a number of milk-soluble substances such as gelatin, "Carbowax" or other materials which are compatible with milk and have similar solidifying and solubility characteristics, I incorporate the medicinal agent into the carrier material while it is in a liquid or semi-solid condition, and distribute the medicinal agent homogeneously throughout the carrier material. The term Carbowax is a trade-name for a compound comprising wax-like polyethylene oxides. I have found that a dosage of ten to fifty milligrams of tyrothricin or acriflavine, or ten to fifteen milligrams of crystal violet, or five thousand Oxford units of penicillin are sufficient to provide a proper treatment of mastitis. Four to ten milligrams of gramicidin in place of tyrothricin, crystal violet, or penicillin are effective also. The entire weight of the bougie, including the carrier body and the medicinal agent, may vary between 300 and 400 milligrams.

While these medicinal agents just mentioned are effective against Gram-positive organisms, additional medicinal agents which are effective against Gram-negative groups of organisms may be employed in the bougie along with those which are effective against Gram-positive organisms. It is now known that streptomycin is effective against Gram-negative organisms. Five thousand to fifty thousand micrograms per bougie will suffice.

Figure 1:
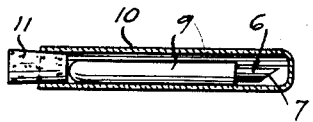

Referring now to Figure 1, my bougie 6, immediately after completion, is encased partially within a tubular sheath 9 having one closed end and formed of a flexible pliant material such as cellophane, parchmentized paper or the like. It will be noted that a considerable portion of the bougie 6, beyond the inclined end 7, is permitted to protrude from the sheath 9 for a purpose later to be described.

The sheath 9 and bougie 6 are encased in a vial 10 formed of a material such as glass, and a closure stopper 11 is used to aid in sealing the end. If desired, a sealing material may be used in addition to the stopper 11 to insure an hermetical seal. In some cases, it may be desirable to evacuate the interior of the vial quite completely before the bougie 6 is sealed therein, or to enclose an hydroscopic agent in the vial with the bougie to absorb moisture from the air in the vial. This is particularly true where any of the medicinal agents employed exhibit any tendency toward hydroscopicity.

Prior to use of the bougie 6, the teat and external orifice thereof should be thoroughly cleansed by use of a suitable disinfectant solution such as sodium hypochlorite.

It is advisable, in an abundance of caution, prior to insertion of the bougie, to express two or three squirts of milk from the teat to remove any foreign material that may have lodged in the streak canal and a drop or two of milk on the end of the bougie prior to insertion will act as a lubricant and facilitate the passage of the bougie through the streak canal. Preferably, when udders are to be treated, they should be milked out so as to leave only enough milk to distend the teat and udder cistern slightly. The remaining milk acts as an ideal menstruum since it is non-reactive with its gland.

Figure 3:
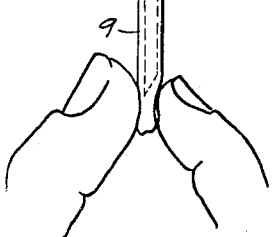
Figure 3 is a diagrammatic view illustrating my bougie during one stage of the inserting process.

Referring now to Figure 3, the inclined or cam end 7 of the bougie 6 is then inserted into the external orifice 12 of the teat 13 of udder 14 and through the streak canal 15 against the constrictive pressure of sphincter muscle 16 so as to enter teat canal 17.

Figure 4:
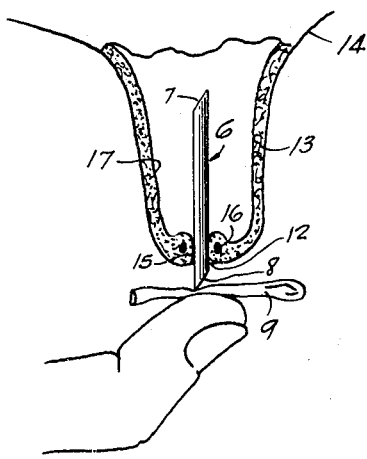
Figure 4 is a diagrammatic view illustrating a further stage of the inserting process.
Figure 5:
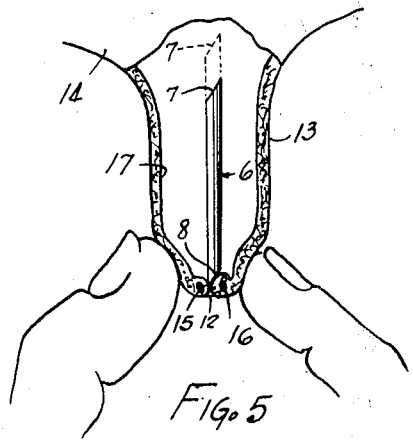
Figure 5 is a diagrammatic view illustrating the final step which results in complete insertion into the teat canal.

After the insertion of the bougie to the extent shown in Figure 3, the pressure of sphincter muscle 16 will easily retain the bougie in position while the sheath 9 is withdrawn and then an untouched portion of the sheath may be pressed against the cam end 8 of the bougie, as shown in Figure 4, to push the bougie farther into the teat canal. After the cam end 8 is forced upwardly into the streak canal, the end of the teat may be squeezed, as shown in Figure 5, to cause pressure on cam surface 8 to force the bougie into the dotted line shown in Figure 5. The bougie will then remain in the milk in the teat canal and dissolve. Preferably the udder should then be massaged slightly to distribute the material of the bougie uniformly through the natural menstruum and all portions of the gland that have continuity of fluid with the udder cistern. Thus, thorough medication will result.

In my use of the method and article hereinabove described, I have found them far more effective than any treatments by the syringe method described, which was the best method known in veterinary medicine prior to this invention, so far as I have learned through my years of specialization in this field. This bougie and method have been used repeatedly and successfully in cases of acutely swollen udders, the conditions of which would have been aggravated by the same amount of medication in the bulky solutions heretofore used.

While I have shown and described my preferred method and article for treatment of mammary glands, I do not wish to be limited to the precise details shown and described herein, but wish to avail myself of all variations coming properly within the scope and spirit of the appended claims.

What is claimed is:

1. In a bougie intended for insertion through the streak canal and into the teat canal of a milk containing udder for the purpose of treating mastitis, said streak canal being encompassed by a sphincter muscle, the combination of: a carrier that is soluble in said milk, inert, non-irritating, and non-reactant with respect to the internal tissues of said udder; and an antibiotic medicinal agent homogeneously diffused throughout said carrier, said bougie having an elongated, slender formation with a cam surface at each of the opposite ends defining a point thereat, said bougie having a body consistency that is rigid at normal temperatures whereby the bougie is adapted for complete enclosure in said teat canal by first inserting one of said points into said streak canal, continuing the insertion by applying pressure to the bougie, with the insertion being completed by constrictive pressure on the cam surface of the other point by said sphincter muscle.

2. In a bougie intended for insertion into the teat canal of a milk containing udder for the purpose of treating mastitis, the combination of: penicillin; and a carrier of polymerized ethylene oxide that is soluble in said milk, rigid at normal temperatures, and impregnated with said penicillin, said bougie being in the form of a narrow elongated slender body having a point at one end whereby its insertion into said canal is facilitated.

3. In a device for treating mastitis in a milk containing udder having a teat with a teat canal and a streak canal encompassed by a sphincter muscle, the combination of: a bougie of an elongated, slender formation having cam surfaces at its opposite ends defining points, said bougie comprising an antibiotic medicinal agent and a carrier impregnated with said agent, said carrier being soluble in said milk and inert, non-irritating, and non-reactant with respect to the internal tissues of said udder; and a flexible pliant wrapper covering one of said points and a substantial part of said bougie whereby said device is adapted to be used by gripping said wrapper, the exposed point at the other end inserted in the entrance to said canal, and the insertion completed by applying pressure through said wrapper to subject the cam surface thereat to constrictive pressure by said sphincter muscle.

4. In a device for treating mastitis in a milk containing udder having a teat with a teat canal and a streak canal encompassed by a sphincter muscle, the combination of: a bougie of an elongated, slender formation having cam surfaces at its opposite ends defining points thereat, said bougie comprising a carrier of polymerized ethylene oxide that is soluble in said milk and having a body consistency that is rigid at normal temperatures, and penicillin homogeneously diffused throughout said carrier; and a flexible pliant wrapper covering one of said ends whereby said device is adapted to be used by gripping said wrapper, inserting the point at the other end into said streak canal, applying pressure through said wrapper to continue the insertion, and subjecting the cam surface at the end covered by said wrapper to constrictive pressure by said sphincter muscle to complete the insertion.

5. In a device for treating mastitis in a milk containing udder having a teat with a teat canal and a streak canal encompassed by a sphincter muscle, the combination of: a bougie of an elongated, slender formation having cam surfaces at its opposite ends defining points, said bougie comprising an antiseptic medicinal agent and a carrier impregnated with said agent, said carrier being soluble in said milk and inert, non-irritating, and non-reactant with respect to the internal tissues of said udder; and a flexible pliant wrapper covering one of said points and a substantial part of said bougie whereby said device is adapted to be used by gripping said wrapper, the exposed point at the other end inserted in the entrance to said canal, and the insertion completed by applying pressure through said wrapper to subject the cam surface thereat to constrictive pressure by said sphincter muscle.

6. In a bougie intended for insertion through the streak canal and into the teat canal of a milk-containing udder for the purpose of treating mastitis, said streak canal being encompassed by a sphincter muscle, the combination of: a carrier that is soluble in said milk, inert, non-irritating, and non-reactant with respect to the internal tissues of said udder; and an antiseptic medicinal agent homogeneously diffused throughout said carrier, said bougie having an elongated, slender formation with a cam surface at each of the opposite ends defining a point thereat, said bougie having a body consistency that is rigid at normal temperatures whereby the bougie is adapted for complete enclosure in said teat canal by first inserting one of said points into said streak canal, continuing the insertion by applying pressure to the bougie, with the insertion being completed by constrictive pressure on the cam surface of the other point by said sphincter muscle.

7. A bougie intended for insertion through the sphincter muscle-controlled teat orifice of the teat of a milk-producing udder into the teat canal, comprising a carrier that is soluble in said milk at body temperatures, and a medicament carried by said carrier suitable for the treatment of mastitis, said bougie being of elongated slender shape and of suitable dimensions and rigidity to be pushed into said teat canal through said teat orifice against the constrictive force of said sphincter muscle and having one end gradually reduced in cross-section to facilitate such insertion.

8. In a device for treating mastitis in a milk-producing udder having a teat with a teat canal and teat orifice controlled by a sphincter muscle, the combination of an elongated, slender milk-soluble bougie carrying a mastitis-treating medicament and having one end gradually reduced in cross-section to facilitate insertion into said orifice and being of suitable dimensions and sufficient rigidity to be pushed through said teat orifice against the constrictive force of said sphincter muscle completely into said teat canal; and a flexible pliant wrapper enveloping the end of said bougie opposite the end reduced in cross-section, whereby said device is adapted to be used by gripping said covered end by the fingers, inserting said end of reduced cross-section into said orifice, and applying pressure upon said bougie through said wrapper to push said bougie through said teat orifice against the constrictive force of said sphincter muscle completely into the teat canal.

9. In the treatment of a mastitis-infected, milk-producing udder having a teat with a teat canal, streak canal and orifice closed by a sphincter muscle, the method of which comprises: gradually overcoming the constrictive force of said sphincter muscle by pushing into said orifice and streak canal the reduced end of an elongated, slender bougie carrying a mastitis-treating medicament and having a body which is milk-soluble at body temperatures and which is of sufficient rigidity and strength to withstand the stresses of insertion into said orifice against the constrictive force of said sphincter muscle, and continuing said pushing force until said sphincter muscle completely entraps said bougie within said teat canal.

10. In the treatment of a mastitis-infected, milk-producing udder having a teat with a teat canal, streak canal and orifice closed by a sphincter muscle, the method of which comprises: gradually overcoming the constrictive force of said sphincter muscle by pushing into said orifice and streak canal the reduced end of an elongated, slender bougie which is milk-soluble at body temperatures, is of sufficient strength and rigidity to withstand the stresses of insertion into said orifice against the constrictive force of said sphincter muscle, and has a mastitis-treating medicament distributed homogeneously throughout said body; and continuing said pushing force until said sphincter muscle closes said orifice and completely entraps said bougie within said teat canal.

FRANCIS E. MARTIN.

(References on following page)

REFERENCES CITED

The following references are of record in the file of this patent:

UNITED STATES PATENTS

| Number | Name | Date |
|---|---|---|
| 197,060 | St. John | Nov. 13, 1877 |
| 398,085 | Schmelz | Feb. 19, 1889 |
| 445,984 | Eberhardt | Feb. 10, 1891 |
| 714,952 | Robinson | Dec. 2, 1902 |
| 1,915,176 | Yamaguchi | June 20, 1933 |
| 2,149,005 | Bockmuhl et al. | Feb. 28, 1939 |
| 2,244,027 | Smith | June 3, 1941 |

FOREIGN PATENTS

| Number | Country | Date |
|---|---|---|
| 205,105 | Great Britain | Oct. 16, 1924 |
| 117,084 | Australia | June 8, 1942 |

OTHER REFERENCES

Proc. Soc. Exptl. Biol. & Med., Oct. 1940, pages 462–463.

North Amer. Vet., May 1942, pages 314–315.

Mfg. Chemist, Aug. 1942, pages 186–187.

Diseases of Cattle (pub. by U. S. Dept. of Agriculture).

The Extra Pharmacopoeia, 20th ed., vol. I, page 793 (1932), Committee on Medical Research of the OSRD, Contract No. OEMcmr, 334, Bimonthly progress report #4, pages 1 and 2, Feb. 4, 1944.

North Amer. Vet., July 1944, pages 408 to 412.